United States Patent
Liu et al.

(10) Patent No.: US 9,766,851 B2
(45) Date of Patent: Sep. 19, 2017

(54) MULTI-TERMINAL SYNCHRONOUS DISPLAY METHOD, DISPLAY APPARATUS AND DISPLAY APPARATUS CASCADING SYSTEM

(71) Applicants: BOE TECHNOLOGY GROUP CO., LTD., Beijing (CN); BEIJING BOE SPECIAL DISPLAY TECHNOLOGY CO., LTD., Beijing (CN)

(72) Inventors: Jianfu Liu, Beijing (CN); Lijun Su, Beijing (CN)

(73) Assignees: BOE TECHNOLOGY GROUP CO., LTD., Beijing (CN); BEIJING BOE SPECIAL DISPLAY TECHNOLOGY CO., LTD., Beijing (CN)

( * ) Notice: Subject to any disclaimer, the term of this patent is extended or adjusted under 35 U.S.C. 154(b) by 420 days.

(21) Appl. No.: 14/375,062

(22) PCT Filed: Nov. 20, 2013

(86) PCT No.: PCT/CN2013/087536
§ 371 (c)(1),
(2) Date: Jul. 28, 2014

(87) PCT Pub. No.: WO2014/205992
PCT Pub. Date: Dec. 31, 2014

(65) Prior Publication Data
US 2016/0274856 A1 Sep. 22, 2016

(30) Foreign Application Priority Data
Jun. 28, 2013 (CN) .......................... 2013 1 0265480

(51) Int. Cl.
*G06F 3/14* (2006.01)
*G09G 5/12* (2006.01)

(52) U.S. Cl.
CPC .......... *G06F 3/1446* (2013.01); *G06F 3/1423* (2013.01); *G06F 3/1431* (2013.01);
(Continued)

(58) Field of Classification Search
CPC ....... G06F 3/1446; G06F 3/1431; G09G 5/12; G09G 2360/04
See application file for complete search history.

(56) References Cited

U.S. PATENT DOCUMENTS

| 6,348,902 B1 | 2/2002 | Lee | |
|---|---|---|---|
| 2012/0200660 A1* | 8/2012 | Verthein | H05B 37/0218 348/14.08 |

(Continued)

FOREIGN PATENT DOCUMENTS

| CN | 2904508 Y | 5/2007 |
|---|---|---|
| CN | 201429944 Y | 3/2010 |
| CN | 201600877 U | 10/2010 |
| CN | 103390396 A | 11/2013 |

OTHER PUBLICATIONS

International Preliminary Report on Patentability Appln. No. PCT/CN2013/087536; Dated Dec. 29, 2015.
(Continued)

*Primary Examiner* — Abbas Abdulselam
(74) *Attorney, Agent, or Firm* — Ladas & Parry LLP

(57) ABSTRACT

A multi-terminal synchronous display method, a display apparatus and a display apparatus cascading system are provided. The method includes receiving an audio and video signal; obtaining a current stage driving signal for driving current stage of display apparatus to output audio and video based on the received audio and video signal; restoring the current stage driving signal to the audio and video signal; and inputting the restored audio and video signal to next stage of display apparatus to make the current stage of display apparatus output audio and video synchronously
(Continued)

with the next stage of display apparatus. It is possible to effectively reduce difficulty of wiring between the signal controller and the display terminals and the cost of the network cable placement by the above technical solutions.

12 Claims, 4 Drawing Sheets

(52) U.S. Cl.
CPC ............ *G06F 3/1438* (2013.01); *G09G 5/12* (2013.01); *G09G 2300/026* (2013.01); *G09G 2310/0291* (2013.01); *G09G 2360/04* (2013.01); *G09G 2370/02* (2013.01); *G09G 2370/042* (2013.01); *G09G 2370/047* (2013.01); *G09G 2370/14* (2013.01); *G09G 2380/06* (2013.01)

(56) References Cited

U.S. PATENT DOCUMENTS

| 2013/0038509 A1* | 2/2013 | Jiang | G06F 3/1446 345/1.3 |
| 2014/0098849 A1* | 4/2014 | Panich | H04N 13/0497 375/240.01 |

OTHER PUBLICATIONS

International Search Report Appln. No. PCT/CN2013/087536; Dated Mar. 7, 2014.

First Chinese Office Action dated Dec. 3, 2014; Appln. No. 201310265480.X.

\* cited by examiner

MULTI-TERMINAL SYNCHRONOUS DISPLAY METHOD, DISPLAY APPARATUS AND DISPLAY APPARATUS CASCADING SYSTEM

TECHNICAL FIELD OF THE DISCLOSURE

The present disclosure relates to the field of display technology, and particularly to a multi-terminal synchronous display method, a display apparatus, and a display apparatus cascading system.

BACKGROUND

Recently, as the display technology develops increasingly, high performance display apparatuses have been more and more used in various public places such as plazas, stations, service windows and railway transportation carriages. In particular, for a railway transportation carriage, several display terminals are usually installed within the carriages. In order to ensure passengers in the same carriage or between different carriages can watch the display pictures synchronously, it is necessary to make the display signals of respective display terminals highly synchronous.

With the fast development of the city railway transportation, the demand for railway transportation vehicles is also increasing continuously, and the vehicle workers have higher and higher demands on simplification of the site operation. In the existing railway transportation, the transmission scheme for audio and video signals of the display terminals within the carriages is usually that one carriage has one signal controller, and such a signal controller encodes multiple paths of differential signals to be output and is connected to each display terminal simultaneously by network cables in order to achieve the object that the signal controller transmits signals to each display terminal simultaneously. As shown in FIG. 1, taking that one carriage is provided with one signal controller and 4 display terminals as an example, the signal controller 11 is connected to four display terminals respectively by network cables. In the practical application procedure, the cable length of the network cable between the signal controller 11 and the display terminal 121 is usually 20 m. If the display terminals are uniformly arranged and separated by 10 m between every two adjacent display terminals, the cable length of the network cables between the signal controller 11 and the display terminal 122 is 30 m, and the others can be obtained similarly. It can be seen that the total cable length for connecting the signal controller and the display terminals are around 140 m when there are four display terminals. In addition, the adoption of such a synchronous display scheme involves a problem of bending when several network cables are wired simultaneously during the installation, and thus the network cable wiring is very cumbersome. Moreover, with the increasing of the distance between the display terminals and the signal controller, the audio and video logical cable length increases dramatically, and this further increases the cost of the network cable placement.

SUMMARY

In order to solve the above problem, embodiments of the present disclosure provide a multi-terminal synchronous display method, a display apparatus and a display apparatus cascading system, which can reduce difficulty of wiring between the signal controller and the display terminals and the cost of the network cable placement.

The embodiments of the present disclosure can employ the following technical solutions.

One aspect of the embodiments of the present disclosure provides a multi-terminal synchronous display method, comprising: receiving an audio and video signal; obtaining a current stage driving signal for driving current stage of display apparatus to output audio and video based on the received audio and video signal; restoring the current stage driving signal to the audio and video signal; and inputting the restored audio and video signal to next stage of display apparatus to make the current stage of display apparatus and the next stage of display apparatus output audio and video synchronously.

Another aspect of the embodiments of the present disclosure provides a display apparatus, comprising: a receiving unit configured to receive an audio and video signal; a processing unit configured to obtain a current stage driving signal for driving current stage of display apparatus to output audio and video based on the received audio and video signal, and also configured to restore the current stage driving signal to the audio and video signal; and an output unit configured to input the restored audio and video signal to next stage of display apparatus to make the current stage of display apparatus output audio and video synchronously with the next stage of display apparatus.

Yet another aspect of the embodiments of the present disclosure provides a display apparatus cascading system comprising a signal controller and multiple display apparatuses as described in the above.

In the multi-terminal synchronous display method, the display apparatus and the display apparatus cascading system, with a cascading manner, each stage of display apparatus receives an audio and video signal sent by a signal controller, and while obtaining a signal for driving the current stage of display apparatus to output audio and video based on the received audio and video signal, it can output the audio and video signal to next stage of display apparatus through gain amplification to realize the synchronous output of the audio and video between the current stage of display apparatus and the next stage of display apparatus. As such, except for the first stage of display apparatus, the driving signals for other respective stages of display apparatuses come from their previous stage of display apparatus, thereby avoiding that the signal controller is connected to each display apparatus respectively, reducing largely the logical cable length, and reducing dramatically the difficulty of wiring between the signal controller and the display terminals and the cost of network cable placement.

BRIEF DESCRIPTION OF THE DRAWINGS

In order to describe the technical solutions of embodiments of the present disclosure or in the prior art, the drawings needing to be used in the description of the embodiments or the prior art are briefly introduced in the following. Obviously, the drawings in the following description are only some embodiments of the present disclosure. It is possible for those ordinary skilled in the art to obtain other drawings based on these drawings without creative work.

DETAILED DESCRIPTION

The technical solutions in embodiments of the present disclosure will be clearly and completely described in connection with the drawings below. Obviously, the described embodiments are only part of embodiments of the present disclosure, but not all embodiments. Based on the embodiments in the present disclosure, all other embodiments obtained by those ordinary skilled in the art without creative work fall in the protection scope of the present disclosure.

Figure 1:
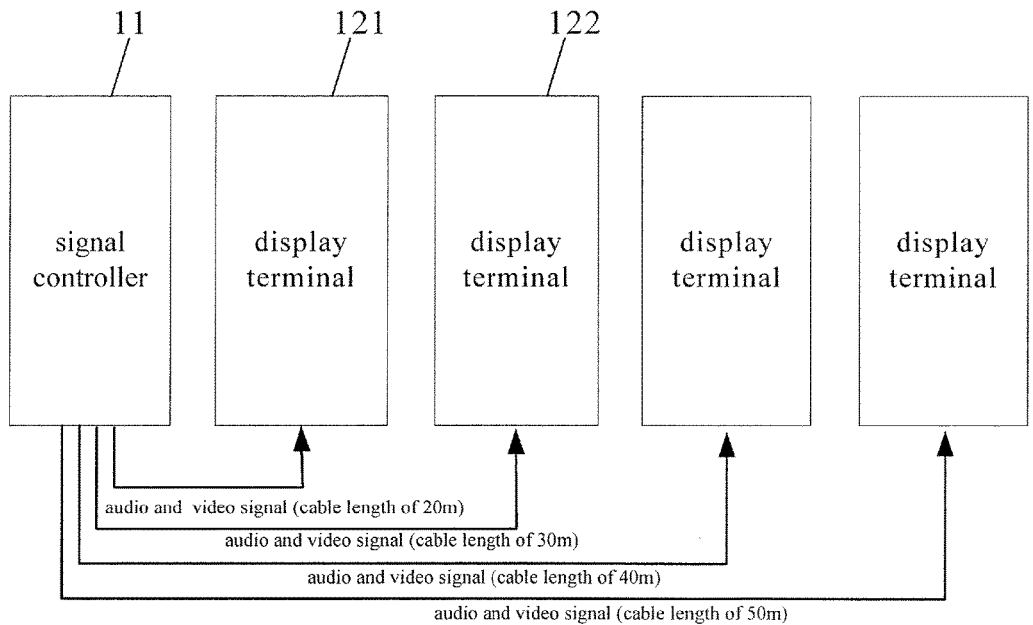
FIG. 1 is a schematic structural diagram of a display terminal cascading system as known in the art.
Figure 2:
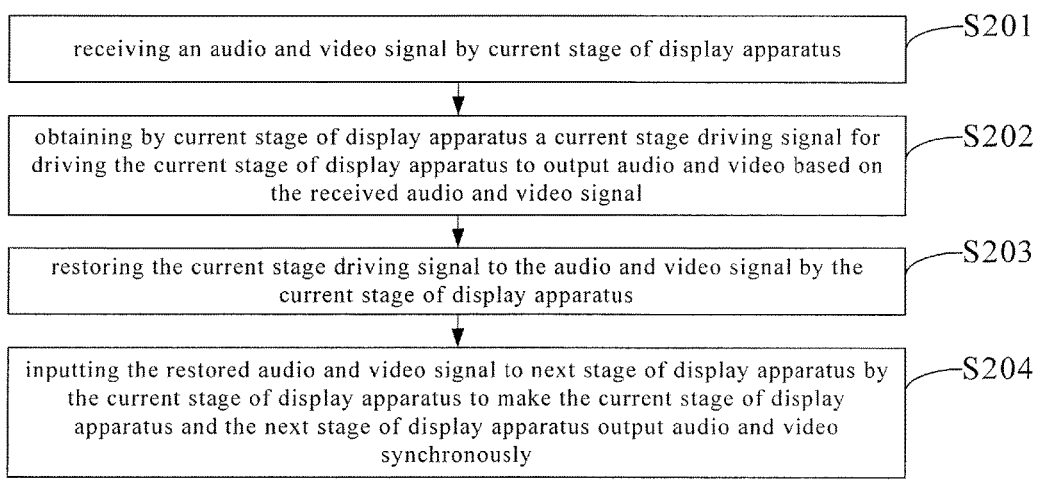
FIG. 2 is a schematic flowchart of a multi-terminal synchronous display method provided in an embodiment of the present disclosure.

As shown in FIG. 2, a multi-terminal synchronous display method according to an embodiment of the present disclosure comprises the following operation procedures.

In step S201, the current stage of display apparatus receives an audio and video signal.

Herein, the audio and video signal can be divided specifically into a video signal and an audio signal. In the practical application process, the video signal can be a differential Video Graphics Array (VGA) signal, and the audio signal can be a differential audio signal.

It is noted that except that the first stage of display apparatus receives the audio and video signal sent by a signal controller, other respectively stages of display apparatuses all receive the audio and video signal output by their respective previous stage of display apparatus.

In step S202, the current stage of display apparatus obtains a current stage driving signal for driving the current stage of display apparatus to output audio and video based on the received audio and video signal.

Specifically, the current stage of display apparatus can obtain a non-differential VGA signal or audio signal by appropriately decoding the received differential VGA signal or differential audio signal, and realize the video output for the current stage of display apparatus through the non-differential VGA signal and realize the audio output for the current stage of display apparatus through the non-differential audio signal.

In step S203, the current stage of display apparatus restores the current stage driving signal to the audio and video signal.

In step S204, the current stage of display apparatus inputs the restored audio and video signal to next stage of display apparatus to make the current stage of display apparatus output audio and video synchronously with the next stage of display apparatus.

According to the multi-terminal synchronous display method provided in the embodiment of the present disclosure, with a cascading manner, each stage of display apparatus receives an audio and video signal sent by a signal controller, and while obtaining a signal for driving the current stage of display apparatus to output audio and video based on the received audio and video signal, it can also output the audio and video signal to next stage of display apparatus by gain amplification to realize the synchronous output of the audio and video between the current stage of display apparatus and the next stage of display apparatus. As such, except for the first stage of display apparatus, the driving signals for other respective stages of display apparatuses come from their previous stage of display apparatus connected in cascade with them, thereby avoiding that the signal controller is connected to each display apparatus respectively, reducing largely the logical cable length, and reducing dramatically the difficulty of wiring between the signal controller and the display terminals and the cost of network cable placement.

Figure 3:
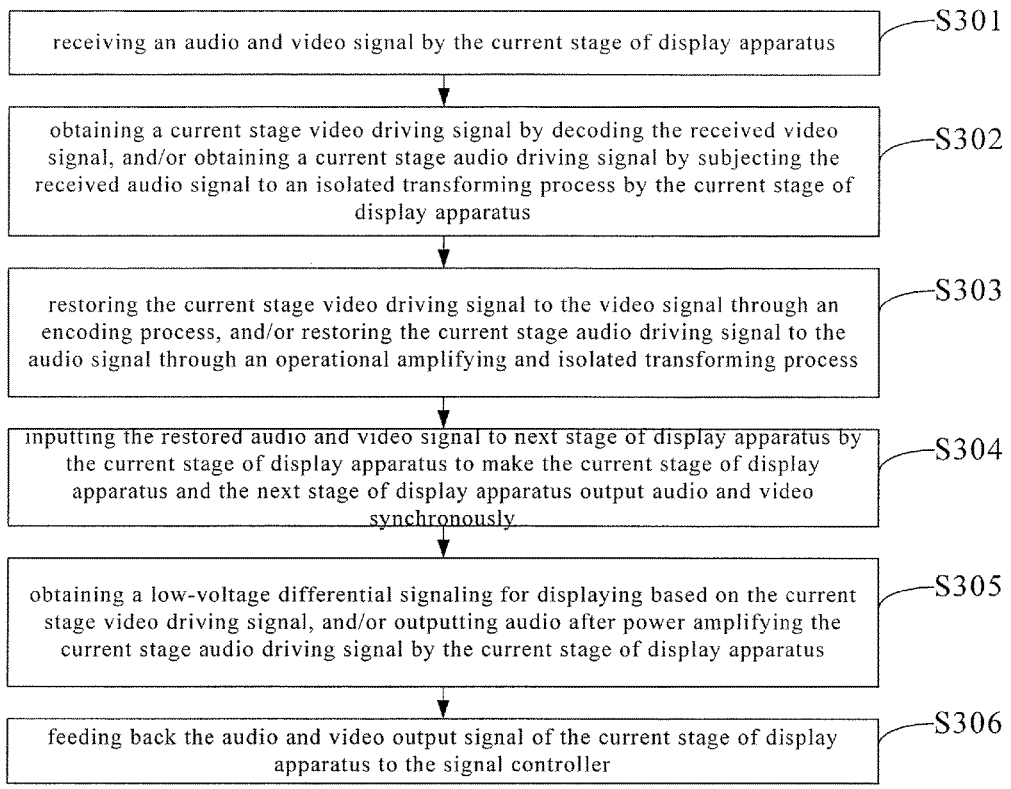
FIG. 3 is a schematic flowchart of another multi-terminal synchronous display method provided in an embodiment of the present disclosure.

More specifically, as shown in FIG. 3, a multi-terminal synchronous display method according to an embodiment of the present disclosure can comprise the following operations.

In step S301, the current stage of display apparatus receives an audio and video signal.

Herein, the audio and video signal can be divided into a video signal and an audio signal specifically. In the practical application process, the video signal can be a differential VGA signal, and the audio signal can be a differential audio signal.

It is noted that except that the first stage of display apparatus receives the audio and video signal sent by a signal controller, other respectively stages of display apparatuses all receive the audio and video signal output by their respective previous stage of display apparatus.

In stage S302, the current stage of display apparatus obtains a current stage video driving signal by subjecting the received video signal to a decoding process, and/or obtains a current stage audio driving signal by subjecting the received audio signal to an isolated transforming process.

Specifically, the present stage of display apparatus can perform decoding process on the received differential VGA signal to obtain a non-differential standard VGA signal (comprising R (red), G (green), B (blue), H (horizontal) and V (vertical) respectively). For example, an ISL59910 chip can be used as the decoder for decoding the video signal. It is noted that ISL59910 is a three channel differential receiver and equalizer which contains three high speed differential receivers and has a function of performing equalization adjusting on frequency and grain. The bandwidth of ISL59910 is 150 MHz, and the equalization length is set by the voltage at one individual pin. The characteristic of ISL59910 is common mode decoding, which can perform decoding on the information in the horizontal direction and the vertical direction. By using such a decoding chip, it is possible to achieve signal gain while completing the signal decoding, thereby guaranteeing the quality of the signal input into the next stage of display apparatus.

In addition, the current stage of display apparatus can also process the received differential audio signal through an isolation transformer to obtain a non-differential audio signal. The isolation transformer can also effectively prevent outside noise being mixed into the audio output at the signal controller side and the audio input of the display apparatus, ensuring the quality of the input audio signal of the display apparatus.

In step S303, the current stage of display apparatus restores the current stage video driving signal to the video signal through an encoding process, and/or restores the current stage audio driving signal to the audio signal through an operational amplifying and isolated transforming process.

For example, corresponding to the ISL59910 decoding chip, it is possible to use an EL4543 chip to encode the video signal. It is noted that the EL4543 chip is a high bandwidth (350 MHz) three-channel differential amplifier, which can perform complete encoding on a video synchronous signal, and its input is suitable for processing single-end or differential high speed video or other communication signals. The high bandwidth is for differential signals on a standard twisted pair or coaxial cable, which has very low harmonic distortion. At the same time, the internal feedback ensures the output to have stable gain and phase in order to reduce electromagnetic interference and harmonic waves of radiation. Embedded logic encodes the horizontally and vertically synchronous signals of standard video onto the common mode signal of the twisted pair. After inputting RGB signal, a VGA signal with synchronous information is connected with the terminal resistor of 75 Ω at the EL4543 input terminal. The single-end RGB signal is converted into a differential mode signal. The horizontally synchronous signal (HSYNC) and the vertically synchronous signal (VSYNC) are coded on respective common mode signals of three differential signals. The 50 Ω terminal output of EL4543 drives the differential R, G and B. The synchronous signal is encoded in the common mode of the CAT-5 twisted pair cable. For a system without signal frequency equalization, it is possible to achieve good transmission at a 200 feet CAT-5 twisted pair.

Similarly, the current stage of display apparatus can also restore the non-differential audio signal to a differential audio signal through an operational amplifying and isolated transforming process. For example, in order to prevent power loss in a long transmission line, an operational amplifier MC4558 can be introduced. As such, it is possible to ensure the quality of the output audio signal of each stage of display apparatus.

In step S304, the current stage of display apparatus inputs the restored audio and video signal to next stage of display apparatus to make the current stage of display apparatus and the next stage of display apparatus output audio and video synchronously.

In stage S305, the current stage of display apparatus obtains a low-voltage differential signaling for displaying based on the current stage video driving signal, and/or output audio after subjecting the current stage audio driving signal to a power amplifying process.

Figure 4:
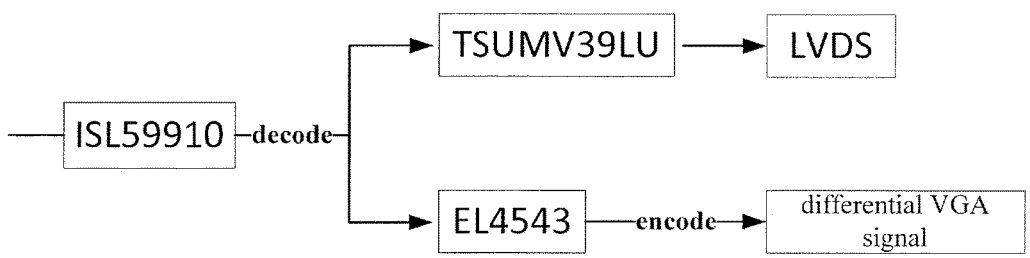
FIG. 4 is a schematic diagram of circuit connection for video cascading in the multi-terminal synchronous display method provided in an embodiment of the present disclosure.

As shown in FIG. 4, for example, for the video signal, when the signal controller sends a differential VGA signal, after the current stage of display apparatus performs video decoding on this signal by the ISL59910 chip to output a standard VGA signal, one path of the standard VGA signal would enter a frequency divider which can be a TSUMV39LU chip to output a Low-Voltage Differential Signaling (LVDS) to the liquid crystal screen, and the other path is video-encoded by EL4543 and output to the next display terminal to accomplish a video cascading scheme.

For the audio signal, the current stage of display apparatus processes the differential audio signal sent by the signal controller through an isolation transformer to obtain a non-differential audio signal, one path of which can be further processed by a power amplifier TDA7496 to output audio.

In step S306, the audio and video output signal of the current stage of display apparatus is fed back to the signal controller.

Specifically, for the first stage of display apparatus, the audio and video output signal output by the frequency divider TSUMV39LU can be fed back to the signal controller through the audio signal receiving terminal. For other respective stages of display apparatuses, since they are not directly connected with the signal controller, the feedback signal can be fed back to the previous stage of display apparatus through the audio signal receiving terminal stage by stage, and finally be input into the signal controller. As such, when the local signal or the connection state of each stage of display apparatus is abnormal, TSUMV39LU does not have output signal to output. This signal is returned to the signal controller side through the audio signal receiving terminal such that the host can monitor whether each display apparatus operates normally in time to provide accurate information for failure detection and subsequent repair.

It is noted that, in the embodiments of the present disclosure, various functional chips are only for exemplary illustration. According to circuit functions, those skilled in the art can also think of adopting other chips or logic circuits with same or similar functions, which are not limited by the present disclosure.

According to the multi-terminal synchronous display method provided in the embodiment of the present disclosure, with a cascading manner, each stage of display apparatus receives an audio and video signal sent by a signal controller, and while obtaining a signal for driving the current stage of display apparatus to output audio and video based on the received audio and video signal, it can also output the audio and video signal to next stage of display apparatus by gain amplification to realize the synchronous output of the audio and video between the current stage of display apparatus and the next stage of display apparatus. As such, except for the first stage of display apparatus, the driving signals for other respective stages of display apparatuses come from their previous stage of display apparatus connected in cascade with them, thereby avoiding that the signal controller is connected to each display apparatus respectively, reducing largely the logical cable length, and reducing dramatically the difficulty of wiring between the signal controller and the display terminals and the cost of network cable placement.

Figure 5:
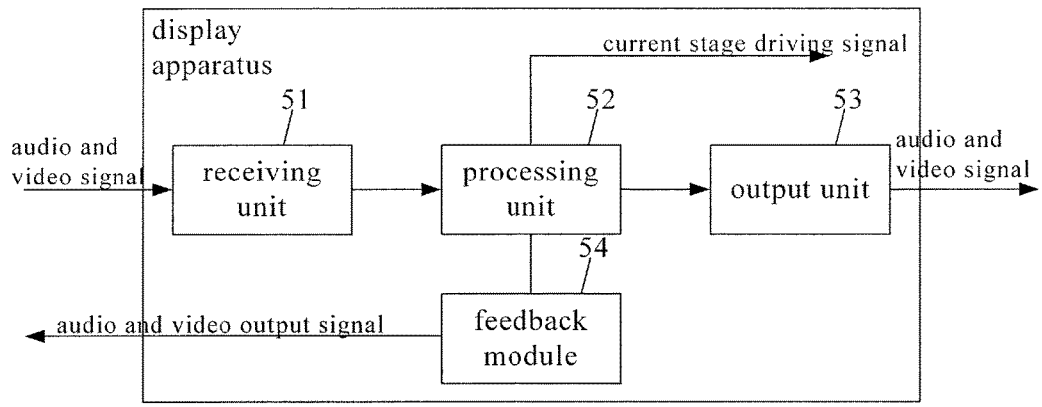
FIG. 5 is a schematic structural diagram of a display apparatus provided in an embodiment of the present disclosure.

As shown in FIG. 5, an display apparatus according to an embodiment of the present disclosure can comprises the following components of:

a receiving unit 51 configured to receive an audio and video signal;

a processing unit 52 configured to obtain a current stage driving signal for driving current stage of display apparatus to output audio and video based on the received audio and video signal, and further configured to restore the current stage driving signal to the audio and video signal;

an output unit 53 configured to input the restored audio and video signal to next stage of display apparatus to make the current stage of display apparatus output audio and video synchronously with the next stage of display apparatus.

In the display apparatus provided in the embodiment of the present disclosure, with a cascading manner, each stage of display apparatus receives an audio and video signal sent by a signal controller, and while obtaining a signal for driving the current stage of display apparatus to output audio and video based on the received audio and video signal, it can also output the audio and video signal to next stage of display apparatus by gain amplification to realize the synchronous output of the audio and video between the current stage of display apparatus and the next stage of display apparatus. As such, except for the first stage of display apparatus, the driving signals for other respective stages of display apparatuses come from their previous stage of display apparatus connected in cascade with them, thereby avoiding that the signal controller is connected to each display apparatus respectively, reducing largely the logical cable length, and reducing dramatically the difficulty of wiring between the signal controller and the display terminals and the cost of network cable placement.

In the embodiment of the present disclosure, the display apparatus can include various display devices for displaying applied in places such as outdoors, stations or carriage inside. For example, it can be any product or means with displaying function such as liquid crystal panels, OLED panels, plate TV sets, digital photo frames, navigators, and so on.

It is noted that except that the first stage of display apparatus receives the audio and video signal sent by a signal controller, other respective stages of display apparatuses all receive the audio and video signal output by their respective previous stages of display apparatuses.

Further, as shown in FIG. 5, the display apparatus can also comprise a feedback module 54 configured to feed back the audio and video output signal of the current stage of display apparatus to the signal controller.

In the embodiment of the present disclosure, the audio and video signal can be divided into a video signal and an audio signal specifically. In the practical application process, the video signal can be a differential VGA signal, and the audio signal can be a differential audio signal.

Figure 6:
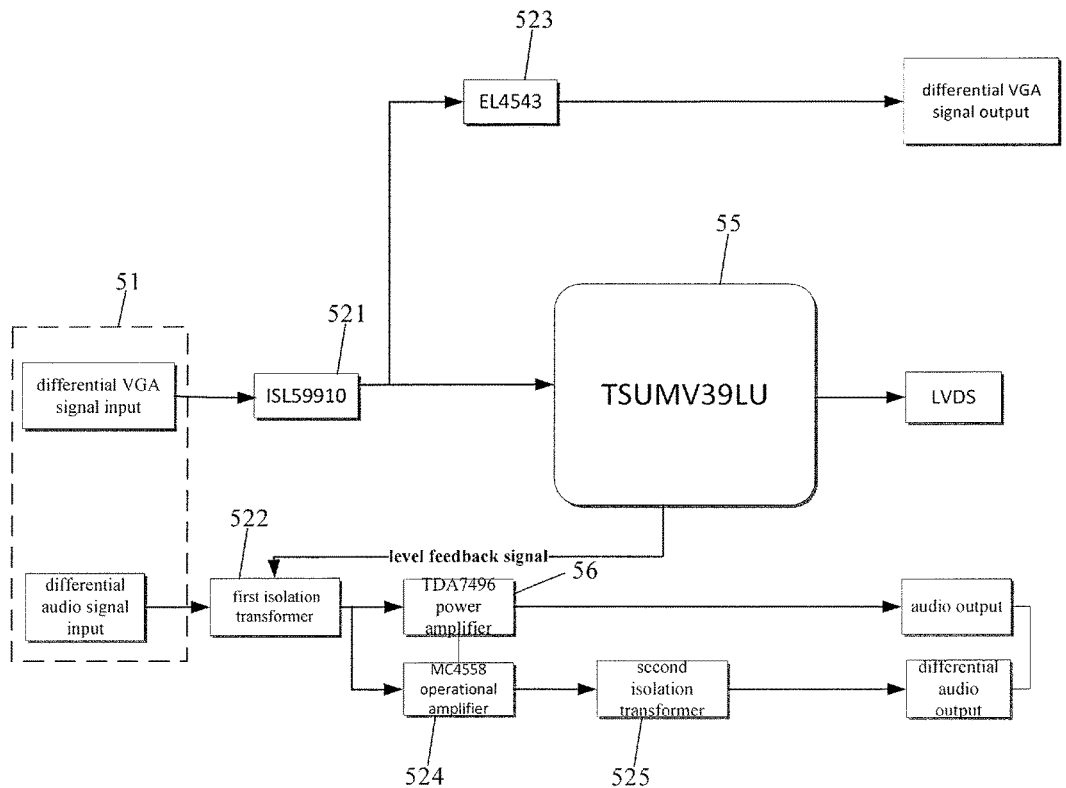
FIG. 6 is a schematic structural diagram of another display apparatus provided in another embodiment of the present disclosure.

As shown in FIG. 6, the processing unit 52 can comprise a decoder 521 configured to obtain a current stage video driving signal by subjecting the received video signal to a decoding process.

Specifically, It is possible to perform decoding process by the decoder on the differential VGA signal received by the present stage of display apparatus to obtain a non-differential standard VGA signal (comprising R (red), G (green), B (blue), H (horizontal) and V (vertical) respectively). For example, an ISL59910 chip can be used as the decoder for decoding the video signal. It is noted that ISL59910 is a three channel differential receiver and equalizer which contains three high speed differential receivers and has a function of performing equalization adjusting on frequency and grain. The bandwidth of ISL59910 is 150 MHz, and the equalization length is set by the voltage at one individual pin. The characteristic of ISL59910 is common mode decoding, which can perform decoding on the information in the horizontal direction and the vertical direction. By using such a decoding chip, it is possible to achieve signal gain while completing the signal decoding, thereby guaranteeing the quality of the signal input into the next stage of display apparatus.

The processing 52 can comprise a first isolation transformer 522 configured to obtain a current stage audio driving signal by subjecting the received audio signal to an isolated transforming process.

The current stage of display apparatus can also process the received differential audio signal through an isolation transformer to obtain a non-differential audio signal. The isolation transformer can also effectively prevent outside noise being mixed into the audio output at the signal controller side and the audio input of the display apparatus, ensuring the quality of the input audio signal of the display apparatus.

Further, as shown in FIG. 6, the processing unit 52 can further comprise an encoder 523 configured to restore the current stage video driving signal to the video signal through an encoding process.

For example, corresponding to the ISL59910 decoding chip, it is possible to use an EL4543 chip to perform encoding on the video signal. It is noted that the EL4543 chip is a high bandwidth (350 MHz) three-channel differential amplifier, which can perform complete encoding on a video synchronous signal. Its input is suitable for processing single-end or differential high speed video or other communication signals. The high bandwidth is for differential signals at a standard twisted pair or coaxial cable, which has very low harmonic distortion. In addition, the internal feedback ensures the output to have stable gain and phase in order to reduce electromagnetic interference and harmonic waves of radiation. Embedded logic encodes the standard video horizontally and vertically synchronous signals into the common mode signal of the twisted pair. A VGA signal with synchronous information, after inputting RGB signal, is connected with the terminal resistor of 75 Ω at the EL4543 input terminal. The single-end RGB signal is converted to a differential mode signal. The horizontally synchronous signal (HSYNC) and the vertically synchronous signal (VSYNC) are coded on respective common mode signals of three differential signals. The 50 Ω terminal output of EL4543 drives the differential R, G and B. The synchronous signal is encoded in the common mode of the CAT-5 twisted pair cable. For a system without signal frequency equalization, it is possible to achieve good transmission at a 200 feet CAT-5 twisted pair.

The processing unit 52 can also comprise an operational amplifier 524 and a second isolation transformer 525 configured to restore the current stage audio driving signal to the audio signal through an operational amplifying and isolated transforming process.

For example, in order to prevent power loss in a long transmission line, an operational amplifier MC4558 can be introduced. As such, it is possible to ensure the quality of the output audio signal of each stage of display apparatus.

Further, as shown in FIG. 6, the display apparatus can also comprise a frequency divider 55 configured to obtain a low-voltage differential signaling for displaying based on the current stage video driving signal.

For example, for the video signal, when the signal controller sends a differential VGA signal, after the current stage of display apparatus performs video decoding on this signal through the ISL59910 chip to output a standard VGA signal, as shown in FIG. 4, one path of the standard VGA signal would enter a frequency divider which can be a TSUMV39LU chip to output a Low-Voltage Differential Signaling (LVDS) to the liquid crystal screen, and the other path is video-encoded by EL4543 and output to the next display terminal to accomplish a video cascading scheme.

Further, the display apparatus can also comprise a power amplifier 56 configured to output audio after subjecting the current stage audio driving signal to a power amplifying process.

For the audio signal, the current stage of display apparatus processes the differential audio signal sent by the signal controller through an isolation transformer to obtain a path of a non-differential audio signal, which can be further processed by a power amplifier TDA7496 to output audio.

The audio and video output signal output by the frequency divider 55 can be fed back to the signal controller through the first isolation transformer 522.

Specifically, for the first stage of display apparatus, the audio and video output signal output by the frequency divider TSUMV39LU can be fed back to the signal controller through the audio signal receiving terminal. For other stages of display apparatuses, since they are not directly connected with the signal controller, the feedback signal can be fed back to the previous stage of display apparatus through the audio signal receiving terminal stage by stage, and finally be input into the signal controller. As such, when the local signal or the connection state of each stage of display apparatus is abnormal, TSUMV39LU does not have output signal to output. This signal is returned to the signal controller side through the audio signal receiving terminal such that the host can monitor whether each display apparatus operates normally in time to provide accurate information for failure detection and subsequent repair.

It is noted that, in the embodiments of the present disclosure, each functional chip is only for exemplary illustration. According to circuit functions, those skilled in the art can also think of adopting other chips or logic circuits with same or similar functions, which are not limited by the present disclosure.

Figure 7:
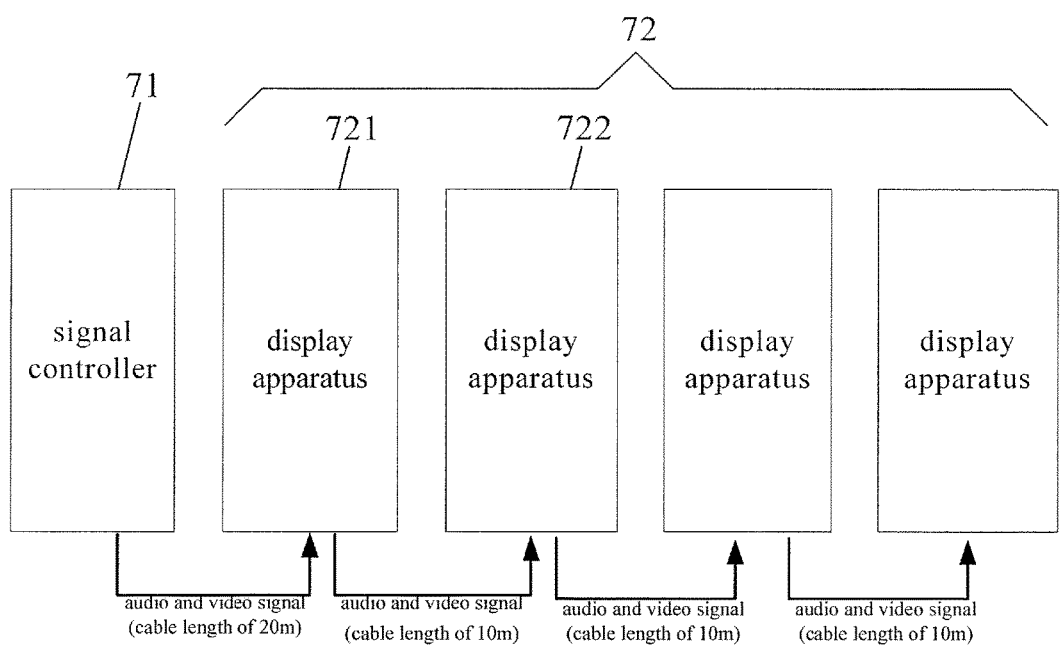
FIG. 7 is a schematic structural diagram of a display apparatus cascading system provided in an embodiment of the present disclosure.

As shown in FIG. 7, a display apparatus cascading system provided by an embodiment of the present disclosure can comprise a signal controller 71 and multiple display apparatuses 72 as described in the above.

The structure of the display apparatus 72 has been described in detail in the above embodiment, which is not repeated here.

In the display apparatus cascading system as shown in FIG. 7, description is made by taking that one carriage is provided with one signal controller 71 and four display apparatus as an example. It can be seen that the signal controller 71 is directly connected with the first stage of display apparatus 721, the first stage of display apparatus 721 outputs a driving signal to the next stage of display apparatus 722, and so on to achieve the cascading of each stage of display apparatus. In the practical application procedure, the cable length of the network cable between the signal controller 11 and the display terminal 121 is usually 20 m, and the display terminals are uniformly arranged and separated by 10 m between every two adjacent display terminals. When there are four display apparatus, the total cable length of the display apparatus cascading system is around 50 m which enables each carriage to save a connection cable of around 90 m compared with the prior art.

It is noted that, in the embodiment of the present disclosure, signal transmission can be performed via network cables between the signal controller 71 and the multiple display apparatuses 72, or signal transmission can be performed via a dedicated VGA signal line between the signal controller 71 and the multiple display apparatuses 72. Their differences are as follows. It is possible to further improve the signal transmission efficiency by using the dedicated VGA signal line to transmit the audio and video signal. However, the dedicated VGA signal line has higher cost than the network cable, and has relatively thick and hard cable material which results in difficulty in construction wiring. In addition, the dedicated VGA signal line has limited transmission distance, and thus it is hard to feed back logic levels of the display apparatuses 72 to the signal controller 71.

The display apparatus cascading system of the embodiment of the present disclosure comprises a signal controller and multiple display apparatuses. With a cascading manner, each stage of display apparatus receives an audio and video signal sent by a signal controller and while obtaining a signal for driving the current stage of display apparatus to output audio and video based on the received audio and video signal, it can also output the audio and video signal to next stage of display apparatus by gain amplification to realize the synchronous output of the audio and video between the current stage of display apparatus and the next stage of display apparatus. As such, except for the first stage of display apparatus, the driving signals for other respective stages of display apparatuses come from their previous stage of display apparatus connected in cascade with them, thereby avoiding that the signal controller is connected to each display apparatus respectively, reducing largely the logical cable length, and reducing dramatically the difficulty of wiring between the signal controller and the display terminals and the cost of network cable placement.

It can be understood by those ordinary skilled in the art that all or part of the steps for implementing the above method embodiment can be realized by a program instructing relative hardware. The above-mentioned program can be stored in a computer readable storage medium. When the program is executed, it performs steps involving the above method embodiment. The above-mentioned storage medium includes various media that can store program codes, such as ROM, RAM, a magnetic disk, an optical disk or the like.

The description is only some specific embodiments of the present disclosure, but the protection scope of the present disclosure is not limited to this. The variations or replacements that can be easily devised within the technical scope disclosed by the present disclosure should all fall in the protection scope of the present disclosure. Therefore, the protection scope should be defined by the protection scope of the claims.

What is claimed is:

1. A multi-terminal synchronous display method, comprising:
   receiving an audio and video signal;
   obtaining a current stage driving signal for driving current stage of display apparatus to output audio and video based on the received audio and video signal;
   restoring the current stage driving signal to the audio and video signal; and
   inputting the restored audio and video signal to next stage of display apparatus to make the current stage of display apparatus and the next stage of display apparatus output audio and video synchronously,
   wherein except that the first stage of display apparatus receives the audio and video signal sent by a signal controller, other respective stages of display apparatuses all receive the audio and video signal output by their respective previous stages of display apparatuses; and
   wherein the method further comprises:
   feeding back the audio and video output signal of the current stage of display apparatus to the signal controller.

2. The multi-terminal synchronous display method according to claim 1, wherein said obtaining a current stage driving signal based on the received audio and video signal comprises;
   obtaining a current stage video driving signal by decoding the received video signal; and
   obtaining a current stage audio driving signal by subjecting the received audio signal to an isolated transforming process.

3. The multi-terminal synchronous display method according to 2, wherein said restoring the current stage driving signal to the audio and video signal comprises:
   restoring the current stage video driving signal to the video signal through an encoding process; and
   restoring the current stage audio driving signal to the audio signal through an operational amplifying and isolated transforming process.

4. The multi-terminal synchronous display method according to 2, further comprising:
   obtaining a low-voltage differential signaling for displaying based on the current stage video driving signal; and
   outputting audio after power amplifying the current stage audio driving signal.

5. A display apparatus, comprising:
- a receiving unit configured to receive an audio and video signal;
- a processing unit configured to obtain a current stage driving signal for driving current stage of display apparatus to output audio and video based on the received audio and video signal and to restore the current stage driving signal to the audio and video signal; and
- an output unit configured to input the restored audio and video signal to next stage of display apparatus to make the current stage of display apparatus and the next stage of display apparatus output audio and video synchronously,
- wherein the receiving unit of the first stage of display apparatus is configured to receive the audio and video signal sent by a signal controller, and the receiving units of other respective stages of display apparatuses all receive the audio and video signal output by their respective previous stages of display apparatuses,
- wherein the display apparatus further comprises:
- a feedback module configured to feed back the audio and video output signal of the current stage of display apparatus to the signal controller.

6. The display apparatus according to claim 5, wherein the processing unit comprises:
- a decoder configured to obtain a current stage video driving signal by decoding the received video signal; and
- a first isolation transformer configured to obtain a current stage audio driving signal by subjecting the received audio signal to an isolated transforming process.

7. The display apparatus according to 6, wherein processing unit further comprises:
- an encoder configured to restore the current stage video driving signal to the video signal by an encoding process; and
- an operational amplifier and a second isolation transformer configured to restore the current stage audio driving signal to the audio signal by an operational amplifying and isolated transforming process.

8. The display apparatus according to 6, further comprising:
- a frequency divider configured to obtain a low-voltage differential signaling for displaying based on the current stage video driving signal; and
- a power amplifier configured to output audio after power amplifying the current stage audio driving signal.

9. The display apparatus according to 8, wherein the audio and video output signal output by the frequency divider are fed back to the signal controller through the first isolation transformer.

10. A display apparatus cascading system comprising:
- a signal controller and multiple display apparatuses according to claim 5.

11. The display apparatus cascading system according to claim 10, wherein signal transmission is performed via network cables between the signal controller and the multiple display apparatuses.

12. The display apparatus cascading system according to claim 10, wherein signal transmission is performed via a dedicated video graphics array signal line between the signal controller and the multiple display apparatuses.

* * * * *